(12) United States Patent
Beck et al.

(10) Patent No.: US 7,571,900 B2
(45) Date of Patent: Aug. 11, 2009

(54) METHOD AND DEVICE FOR COOLING CIRCULATING AIR

(75) Inventors: Edgar Beck, Balzers (LI); Christoph Steinhausler, Gschwandt (AT)

(73) Assignee: Hovalwerk AG, Vaduz (LI)

( * ) Notice: Subject to any disclaimer, the term of this patent is extended or adjusted under 35 U.S.C. 154(b) by 527 days.

(21) Appl. No.: 10/536,614

(22) PCT Filed: Nov. 25, 2003

(86) PCT No.: PCT/EP03/13243

§ 371 (c)(1),
(2), (4) Date: Jan. 19, 2006

(87) PCT Pub. No.: WO2004/048859

PCT Pub. Date: Jun. 10, 2004

(65) Prior Publication Data

US 2006/0118979 A1 Jun. 8, 2006

(30) Foreign Application Priority Data

Nov. 27, 2002 (DE) ............................... 102 55 530

(51) Int. Cl.
*B01F 3/04* (2006.01)
(52) U.S. Cl. .................. 261/152; 261/157; 261/161
(58) Field of Classification Search ............... 261/152, 261/157, 158, 159, 160, 161
See application file for complete search history.

(56) References Cited

U.S. PATENT DOCUMENTS

| | | | | |
|---|---|---|---|---|
| 2,414,135 A | * | 1/1947 | Berlowitz | 261/161 |
| 3,621,652 A | * | 11/1971 | Demaree | 60/277 |
| 4,002,040 A | * | 1/1977 | Munters et al. | 62/121 |
| 4,598,766 A | * | 7/1986 | Michalak et al. | 165/104.16 |
| 4,910,971 A | | 3/1990 | McNab | |
| 5,182,921 A | * | 2/1993 | Yan | 62/235.1 |
| 5,692,384 A | * | 12/1997 | Layton | 62/91 |
| 5,724,828 A | * | 3/1998 | Korenic | 62/305 |
| 5,816,318 A | * | 10/1998 | Carter | 165/110 |
| 6,938,434 B1 | * | 9/2005 | Fair | 62/309 |

FOREIGN PATENT DOCUMENTS

| | | |
|---|---|---|
| DE | 43 28 930 A1 | 3/1995 |
| DE | 195 19 511 A1 | 12/1995 |
| WO | WO 93/18833 * | 9/1993 |
| WO | WO 97/30315 | 8/1997 |

* cited by examiner

*Primary Examiner*—Scott Bushey
(74) *Attorney, Agent, or Firm*—Fay Sharpe LLP

(57) ABSTRACT

Circulating air is cooled by heat exchange with adiabatically cooled process air. To this end, a first heat exchanging device is fed with circulating air and the process air. The heat exchanging device contains a humidifying device used to spray water into the process air. In this way, the process air is adiabatically cooled and the corresponding cooling is carried out by heat exchange with the circulating air. Before entering the first heat exchanging device and before leaving same, the process air is guided through a second heat exchanging device in which the cooled process air first extracts heat from the uncooled process air. This increases the cooling performance of the device.

9 Claims, 1 Drawing Sheet

METHOD AND DEVICE FOR COOLING CIRCULATING AIR

This application claims the priority benefit (under 35 U.S.C. 120 of a prior national stage application under 35 U.S.C. 371) of International Application No. PCT/EP03/13243 filed Nov 25, 2003, of which the instant application is the national stage filing, and of original foreign application DE 102 55 530.3 filed Nov. 27, 2002.

The invention relates to a method and an apparatus for cooling circulating air by means of heat exchange with adiabatically cooled process air.

The invention is the field of so-called indirect adiabatic cooling since the water necessary for the adiabatic cooling is not introduced into the circulating air but into the process air, which is preferably atmospheric air. The adiabatically cooled process air constitutes an enthalpy sink which comes into heat exchange with the circulating air and reduces its temperature.

The cooling capacity of such systems depends on the starting temperature and humidity of the process air. If this temperature is e.g. relatively high, the cooling capacity is inadequate to effectively cool the circulating air. One was therefore previously obliged to use an additional cooling installation of compression or absorption type.

Such cooling installations increase the technical complexity of the apparatus. They consume high grade energy in the form of electric current or fossil fuels and also operate with environmentally harmful refrigerants. Legal regulations are increasingly necessary which regulate the consumption of high grade energy and the use of environmentally harmful substances.

It is the object of the invention to increase the efficiency of indirect adiabatic cooling of circulating air with simple means.

In order to solve this object, the method referred to above is characterised in accordance with the invention in that after its heat exchange with the circulating air, the cooled process air absorbs heat from the uncooled process air.

After its heat exchange with the circulating air, the cooled process air has a temperature, which is below the temperature of the uncooled process air. It can thus absorb heat from the uncooled process air so that its temperature decreases. The adiabatic cooling thus acts on process air, whose temperature has already been reduced. This is to the benefit of the cooling of the circulating air with the result that additional cooling installations of compression or absorption type can be omitted, in applications in which the sensible cooling of the circulating air is sufficient. The technical apparatus cost necessary for this purpose is low. In addition to the investment costs, the operating costs also decrease since less energy and less water are consumed.

It is also to be emphasised that no approval process is necessary for operation of the cooling installation. Maintenance is simplified because no refrigeration specialist need be consulted. All damage to the environment resulting from the use of refrigerants is also eliminated.

The adiabatic cooling of the process air can occur before the process air comes into heat exchange with the circulating air. One can then refer to a two-stage evaporation process. A single stage evaporation process can be more advantageous, in which the adiabatic cooling of the process air is effected in heat exchange with the circulating air. In contrast to the two stage evaporation process, the heat exchange surfaces are wetted with the injected water.

Depending on the operational state, the water temperature can vary during the single stage adiabatic cooling. Surprisingly, it has been found that important effects on the conduct of the method are produced. If the water temperature decreases, it is advantageous to conduct the circulating air and the process air in co-current in the heat exchange process. In other cases, counter current is more favourable. It is thus proposed in embodiments of the invention that the circulating air and the process air be conducted either in co-current, counter current or cross-current or in cross-co-current or cross-counter current during the heat exchange process.

The cooling performance is preferably controllable by variation of the circulating air/process air mass flow ratio and/or by variation of the amount of water introduced into the process air.

The cooled process air is preferably exhausted after it has absorbed heat from the uncooled process air.

The apparatus for solving the object posed has a first heat exchanger device, which may be fed with the circulating air and with process air, and a moistening device for introducing water into the process air and is characterised in accordance with the invention by a second heat exchanger device for heat exchange between the uncooled process air, before its entry into the first heat exchanger device, and the cooled process air, after its discharge from the heat exchanger device. The process air thus flows firstly through the second heat exchanger device and then through the first heat exchanger device, whereafter it is diverted through the second heat exchanger device. The cooled process air absorbs heat from the uncooled process air in the second heat exchanger device and thus reduces its temperature.

The second heat exchanger device may advantageously be bypassed, at least on the inlet side of the uncooled process air, by means of a bypass in the event that the temperature of the uncooled process air makes pre-cooling it in the second heat exchanger device unnecessary. Having regard to this aspect, the moistening device may preferably also be switched off. Finally, a preferred possibility resides in operating with so-called free cooling, in which the atmospheric air is used directly for cooling the space.

The moistening device can be in the form of a scrubber, a contact moistener, a high pressure moistener or the like. It can be located between the first and second heat exchanger devices. This type of arrangement can, as mentioned, be referred to as two-stage evaporation. Single stage evaporation, in which the moistening device is integrated in the first heat exchanger device, is, under certain circumstances, more advantageous. The water is thus injected directly into the first heat exchanger device and wets its heat exchange surfaces.

The first heat exchanger device is preferably operable in counter current, co-current or cross-current, depending on whether the temperature of the water increases or decreases in the adiabatic cooling.

It is proposed in an important embodiment of the invention that the first heat exchanger device has at least two cross-current heat exchangers, these preferably being operable in cross-counter current or cross-co-current.

The process air is advantageously exhausted by a blower, which is arranged in the pathway of the process air downstream of the second heat exchanger device. The blower thus sucks the process air through the apparatus. The arrangement is such that the heating of the process air necessarily produced by the blower does not impair the cooling performance.

The invention will be explained in more detail below with reference to a preferred exemplary embodiment in conjunction with the attached drawing, in which.

Figure 1:
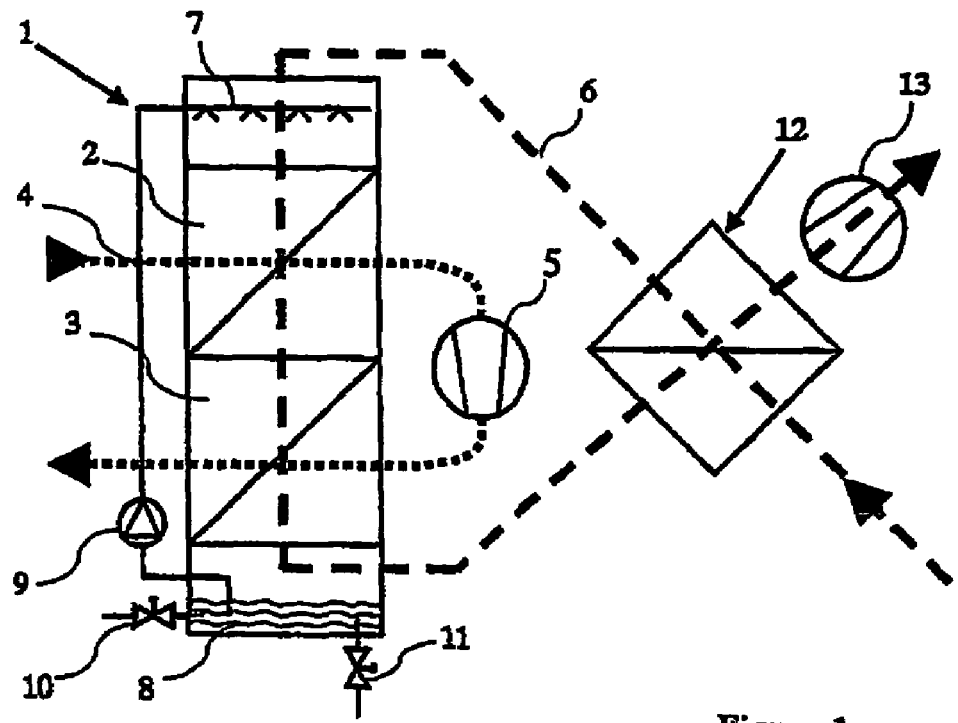
FIG. 1 is a schematic view of an apparatus in accordance with the invention.

As shown in FIG. 1, a first heat exchanger device 1 is provided, which includes two cross current heat exchangers 2 and 3. The first heat exchanger device 1 has circulating air applied to it and this firstly flows through the cross-flow heat exchanger 2 and then through the cross-flow heat exchanger 3. A blower 5 is responsible for the movement of the circulating air.

The first heat exchanger device 1 also has process air 6 applied to it, which is atmospheric air in the present case. The process air also flows firstly through the cross-flow heat exchanger 2 and then through the cross-flow heat exchanger 3. The first heat exchanger device 1 thus operates in cross-co-current, which is advantageous because the operational state of the apparatus results in cooling of the water injected into the first heat exchanger device 1.

For this purpose, the first heat exchanger device 1 is provided with a moistening device 7, which sprays the water into the process air 6 and thus effects adiabatic cooling thereof. The water accumulates in a sump 8 and is applied to the moistening device 7 by a pump 9. The sump 8 is provided with a water supply 10 and a water drain 11.

Before entry into the first heat exchanger device 1 and after discharge from it, the process air 6 flows through a second heat exchanger device 12 under the action of a blower 13, which is arranged downstream of the second heat exchanger device 12, with respect to the cooled process air. The heat generated by the blower 13 can not impair the cooling performance. Since the temperature of the cooled process air 6 is lower, after discharge from the first heat exchanger device 1, than the temperature of the process air 6 before entry into the second heat exchanger device 12, heat exchange can occur in the latter between the two flows of the process air with the result that the process air 6 is subjected to the adiabatic cooling with a reduced temperature. The result is a corresponding increase in the cooling performance.

Figure is a h,x-diagram showing an example of one-stage adiabatic cooling, as may be performed with the apparatus of FIG. 1, a line a indicating the temperature reduction of the circulating air 4 in the first heat exchanger device 1. A line b shows the temperature reduction experienced by the process air 6 in the second heat exchanger device 12. A line c indicates the temperature reduction of the process air 6 as a result of the adiabatic cooling in the first heat exchanger device 1 and a line d indicates the temperature increase of the process air 6 in the second heat exchanger device 12.

Figure 2:
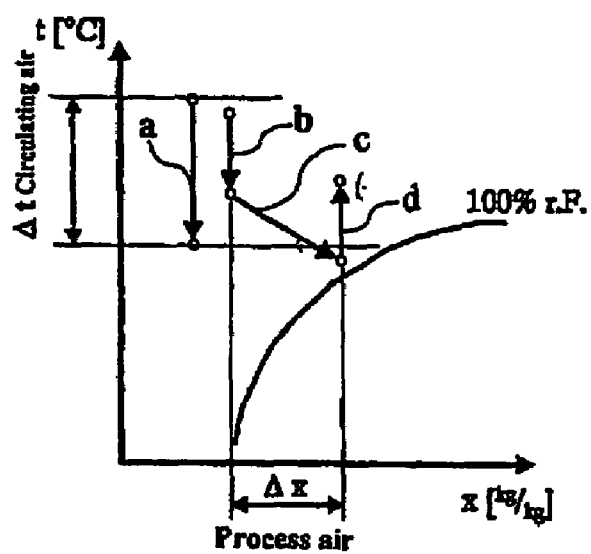
FIG. 2 shows the changes in state of the circulating air and of the process air in an h, x-diagram.

Modifications are of course possible within the scope of the invention. Thus the conveying direction of the blower 5 can be reversed. The first heat exchanger device 1 then operates in cross-counter flow mode. This mode of operation will be selected if the water temperature does not decrease between the process air inlet and outlet. There is also the possibility of decoupling the moistening device from the first heat exchanger device and permitting it to operate between the two heat exchanger devices. The integration of the moistening device into the first heat exchanger device is, however, particularly advantageous. The first heat exchanger device can be of single stage construction but can have a multi-stage construction, as also can the second heat exchanger device. There is also the possibility of bypassing the second heat exchanger device with a bypass, whereby the lines b and d in the diagram of FIG. 2 disappear. If, as is also possible, the moistening device 7 is switched off, line c also disappears. The cooling effect then results only from the temperature difference the circulating air and the process air. Finally, the first heat exchanger device can also be decoupled. The process air is then blown directly into the space to be cooled.

The invention claimed is:

1. An apparatus for indirectly and adiabatically cooling a circulating air, the apparatus comprising:
    a first heat exchanger device being fed with the circulating air and with a process air, the first heat exchanger for heat exchange between the circulating air and the process air;
    a second heat exchanger device for heat exchange between the uncooled process air before its entry into the first heat exchanger device and the cooled process air after its discharge from the first heat exchanger device; and
    a moistening device for introducing water into the process air after its discharge from the second heat exchanger device and before its entry into the first heat exchanger device.

2. The apparatus of claim 1, further including a bypass for bypassing the second heat exchanger device, at least on the inlet side of the uncooled process air.

3. The apparatus of claim 1, wherein the first heat exchanger device a co-current heat exchanger.

4. The apparatus of claim 1, wherein the first heat exchanger device is a counter-current heat exchanger.

5. The apparatus of claim 1, wherein the first heat exchanger device is a cross-current heat exchanger.

6. The apparatus of claim 1, wherein the first heat exchanger device includes at least two cross-current heat exchangers.

7. The apparatus of claim 6, wherein the at least two cross-current heat exchangers of the first heat exchanger device are connected to form a cross-co-current heat exchanger.

8. The apparatus of claim 6, wherein the two cross-current heat exchangers of the first heat exchanger device are connected to form a cross-counter current heat exchanger.

9. The apparatus of claim 1, further including a blower for exhausting the process air arranged in the pathway of the cooled process air downstream of the second heat exchanger device.

* * * * *